(12) United States Patent
Chen

(10) Patent No.: US 10,647,591 B2
(45) Date of Patent: May 12, 2020

(54) HIGH-MAGNESIUM CONCENTRATED LIQUID

(71) Applicant: QUALITY PURE CO., LTD., Taipei (TW)

(72) Inventor: Guan-Hao Chen, Taipei (TW)

(73) Assignee: Quality Pure Co., Ltd., Taipei (TW)

( * ) Notice: Subject to any disclaimer, the term of this patent is extended or adjusted under 35 U.S.C. 154(b) by 103 days.

(21) Appl. No.: 15/982,521

(22) Filed: May 17, 2018

(65) Prior Publication Data

US 2018/0265373 A1 Sep. 20, 2018

Related U.S. Application Data

(63) Continuation-in-part of application No. 15/277,148, filed on Sep. 27, 2016, now Pat. No. 10,000,395.

(30) Foreign Application Priority Data

Aug. 26, 2016 (TW) .............................. 105127429 A

(51) Int. Cl.
*A23L 2/72* (2006.01)
*C02F 1/44* (2006.01)
(Continued)

(52) U.S. Cl.
CPC .............. *C02F 1/003* (2013.01); *A23L 2/72* (2013.01); *C02F 9/00* (2013.01); *A23V 2002/00* (2013.01);
(Continued)

(58) Field of Classification Search
CPC ........ C02F 1/003; C02F 9/00; C02F 2103/08; C02F 1/04; C02F 1/68; C02F 1/444; C02F 2103/026; C02F 1/441; C02F 1/005; C02F 1/02; C02F 1/44; C02F 1/686; A23L 2/72; A23L 2/00; A23L 2/74; A23V 2002/00; A23V 2200/306; A61K 9/08; A61K 33/00;
(Continued)

(56) References Cited

U.S. PATENT DOCUMENTS

| | | |
|---|---|---|
| 4,141,825 A | 2/1979 | Conger |
| 4,161,446 A | 7/1979 | Coillet |

(Continued)

FOREIGN PATENT DOCUMENTS

| | | | |
|---|---|---|---|
| EP | 2298702 B1 | 1/2014 | |
| WO | WO 2004/030680 | * 4/2004 | ............. A61K 33/00 |

*Primary Examiner* — Joseph W Drodge
(74) *Attorney, Agent, or Firm* — Muncy, Geissler, Olds & Lowe, P.C.

(57) ABSTRACT

A high-magnesium concentrated liquid is disclosed. In a first embodiment, the high-magnesium concentrated liquid comprises magnesium ranged from 60000-70000 ppm, sodium ranged from 1000-3200 ppm, potassium ranged from 300-3000 ppm, calcium ranged from 100-300 ppm, and the balance of water. In a second embodiment, the high-magnesium concentrated liquid comprises magnesium ranged from 40000-50000 ppm, sodium ranged from 8000-28000 ppm, potassium ranged from 3000-20000 ppm, calcium ranged from 15-500 ppm, and the balance of water. In a third embodiment, the high-magnesium concentrated liquid comprises magnesium ranged from 80000-100000 ppm, sodium ranged from 3200-12000 ppm, potassium ranged from 3000-20000 ppm, calcium ranged from 100-200 ppm, and the balance of water.

9 Claims, 12 Drawing Sheets

(51) Int. Cl.
*C02F 1/00* (2006.01)
*C02F 9/00* (2006.01)
*C02F 103/02* (2006.01)
*C02F 103/08* (2006.01)
*C02F 1/04* (2006.01)
*C02F 1/68* (2006.01)

(52) U.S. Cl.
CPC .......... *A23V 2200/306* (2013.01); *C02F 1/04* (2013.01); *C02F 1/441* (2013.01); *C02F 1/444* (2013.01); *C02F 1/68* (2013.01); *C02F 2103/026* (2013.01); *C02F 2103/08* (2013.01)

(58) Field of Classification Search
CPC .......... A61K 33/06; A61K 33/10; B01D 9/00; B01D 9/018; B01D 9/0031; B01D 9/0059; B01D 61/04; B01D 61/10; B01D 61/14; B01D 61/142; B01D 61/145; B01D 61/147; B01D 61/16; B01D 61/20; B01D 61/58; B01D 2311/02; B01D 2311/04; B01D 2311/2673
USPC ... 210/96.2, 101, 182, 257.2, 258, 259, 641, 210/652, 790, 806; 423/580.1; 426/66, 426/74
See application file for complete search history.

(56) References Cited

U.S. PATENT DOCUMENTS

| | | | |
|---|---|---|---|
| 4,169,789 A | 10/1979 | Lerat | |
| 4,434,057 A | 2/1984 | Marquardt | |
| 4,882,181 A * | 11/1989 | Giddey | A23G 1/56 426/74 |
| 4,888,185 A * | 12/1989 | Miller | A23K 40/00 426/72 |
| 5,185,166 A * | 2/1993 | Nakagawa | A23C 9/1425 426/330.2 |
| 5,264,227 A * | 11/1993 | Laroche | A23K 10/33 426/2 |
| 5,306,511 A * | 4/1994 | Whang | A61K 33/00 426/66 |
| 5,814,224 A | 9/1998 | Khamizov et al. | |
| 5,849,346 A * | 12/1998 | Hornack | A23F 5/243 426/66 |
| 6,261,609 B1 * | 7/2001 | Cates, II | A23K 10/33 426/72 |
| 6,572,902 B2 * | 6/2003 | Abramowitz | A23L 2/52 204/228.3 |
| 6,793,947 B2 * | 9/2004 | Bachmeier | A23K 20/20 426/623 |
| 7,329,358 B2 | 2/2008 | Wilkins et al. | |
| 8,354,099 B2 * | 1/2013 | Maor | A61K 8/965 424/45 |
| 8,431,551 B2 * | 4/2013 | Duoibes | A61K 8/44 514/62 |
| 10,000,395 B2 * | 6/2018 | Chen | B01D 61/025 |
| 2002/0166758 A1 | 11/2002 | Vinz | |
| 2004/0076687 A1 * | 4/2004 | Thompson | A61K 35/08 424/680 |
| 2005/0123651 A1 * | 6/2005 | Hahn | A61K 8/19 426/74 |
| 2005/0123670 A1 * | 6/2005 | Vasquez | A23L 27/45 426/649 |
| 2005/0145114 A1 * | 7/2005 | Kaehne | A23L 2/52 99/536 |
| 2006/0144789 A1 | 7/2006 | Cath et al. | |
| 2008/0025908 A1 * | 1/2008 | Chu | C01D 3/06 423/463 |
| 2008/0292755 A1 * | 11/2008 | Green | A23L 2/52 426/66 |
| 2010/0163471 A1 | 7/2010 | Elyanow et al. | |
| 2010/0189812 A1 * | 7/2010 | Ogura | A61K 33/00 424/630 |
| 2011/0198285 A1 | 8/2011 | Wallace | |
| 2011/0303606 A1 | 12/2011 | Takeuchi et al. | |
| 2012/0160753 A1 | 6/2012 | Vora et al. | |
| 2012/0305459 A1 | 12/2012 | Takabatake et al. | |
| 2012/0328738 A1 | 12/2012 | Green | |
| 2013/0002001 A1 | 1/2013 | Allen et al. | |
| 2013/0056417 A1 | 3/2013 | Abd Ellatif | |
| 2013/0122150 A1 * | 5/2013 | Kim | A23L 2/38 426/66 |
| 2014/0151300 A1 | 6/2014 | Savage et al. | |
| 2014/0197029 A1 | 7/2014 | Sparrow et al. | |
| 2014/0311980 A1 | 10/2014 | Weston et al. | |
| 2015/0029074 A1 * | 1/2015 | Lee | H01Q 1/002 343/906 |
| 2015/0376033 A1 | 12/2015 | Tao et al. | |
| 2016/0051583 A1 * | 2/2016 | Willeford | A61K 33/14 424/678 |
| 2016/0244648 A1 | 8/2016 | Adams | |
| 2017/0312311 A1 * | 11/2017 | Choung | A61K 33/06 |
| 2019/0175460 A1 * | 6/2019 | Su | A61K 8/19 |

* cited by examiner

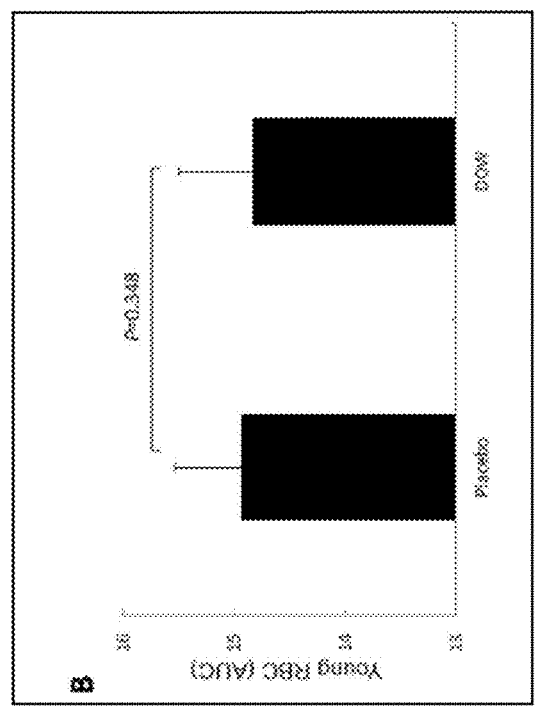
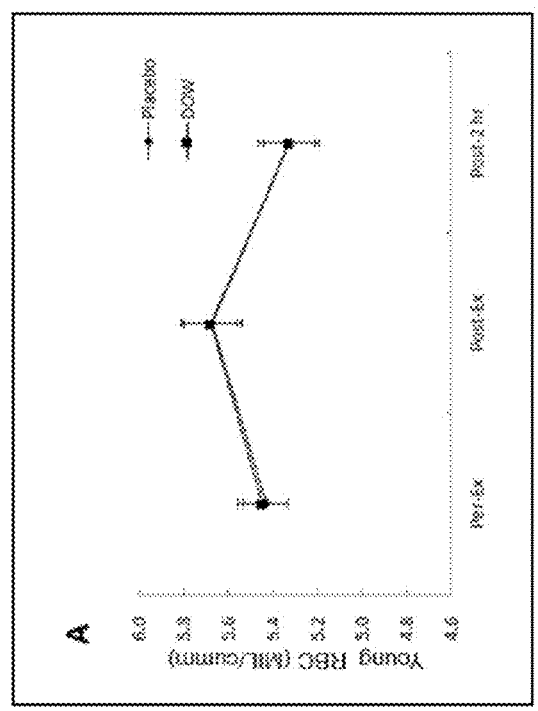
Fig. 5B
Fig. 5A

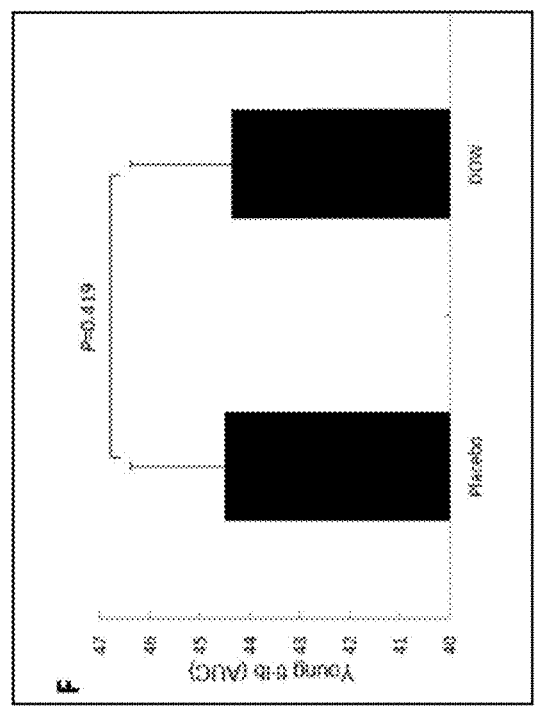
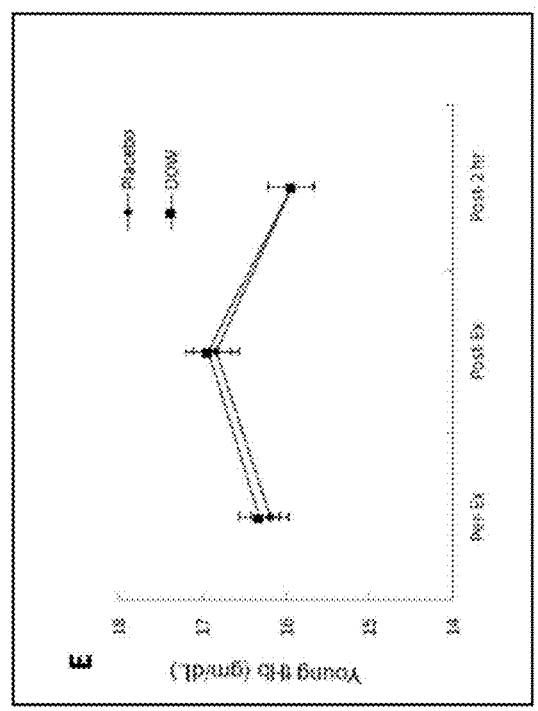
Fig. 5F
Fig. 5E

HIGH-MAGNESIUM CONCENTRATED LIQUID

CROSS-REFERENCE TO RELATED APPLICATION

This application continues in part from U.S. patent application Ser. No. 15/277,148, filed Sep. 27, 2016, which claims priority of Taiwanese Patent Application No. 105127429, filed on Aug. 26, 2016. Both of which are hereby incorporated by reference in their entirety for all purposes.

FIELD OF THE INVENTION

The present invention relates to a potable-water concentrated liquid, particularly to a high-magnesium concentrated liquid.

BACKGROUND OF THE INVENTION

Water is an important constituent of human bodies. Appropriate supplement of water can improve metabolism and blood circulation of human bodies. Awakening to importance of healthcare, people have begun to demand the quality of potable water recently. Thus, the industry is also driven to develop the related technology.

A European patent No. 2298702B1 disclosed a potable-water purification device, which comprises a water purification chamber and a biocide dispensing box. The biocide dispensing box is in fluid communication with a biocide storage compartment and a biocide dispensing port. The water purification chamber is in fluid communication with a pure water discharge chamber through a filter. The pure water discharge chamber includes a water discharge mechanism. The prior art is characterized in that the water purification chamber includes a fill cup and that the fill cup includes an inlet port and a porthole. The fill cup is positioned at the top end of the water purification chamber and in fluid communication with the water purification chamber through the porthole. The device further comprises a vertical tube connected with the fill cup and the biocide dispensing box. A positive air pressure is created in the vertical tube connected with the biocide dispensing box to enable the biocide to be dispensed into the water purification chamber. A U.S. Pat. No. 7,329,358B2 disclosed a water purification method, which comprises steps: providing feed water into an electrochemical purification device; controlling hardness of the water from the electrochemical purification device to a hardness level in a range of 5 ppm-100 ppm as $CaCO_3$; controlling alkalinity of the water from the electrochemical purification device to an alkalinity level in a range of 10 ppm-100 ppm as $CaCO_3$; and supplying the water of controlled alkalinity and reduced hardness as purified water for human consumption.

The conventional technologies usually lay stress on removing the harmful materials in water. However, the conventional technologies do not pay attention to increasing the useful constituents of water. Therefore, the conventional technologies still have room to improve.

SUMMARY OF THE INVENTION

The primary objective of the present invention is to solve the problem that the potable water provided by the conventional technologies does not contribute positive effects to human bodies.

In order to achieve the abovementioned objective, the present invention provide a high-magnesium concentrated liquid, which comprises magnesium ranged from 60000-70000 ppm, sodium ranged from 1000-3200 ppm, potassium ranged from 300-3000 ppm, calcium ranged from 100-300 ppm, and the balance of water.

In order to achieve the abovementioned objective, the present invention also provides another high-magnesium concentrated liquid, which comprises magnesium ranged from 40000-50000 ppm, sodium ranged from 8000-28000 ppm, potassium ranged from 3000-20000 ppm, calcium ranged from 15-500 ppm, and the balance of water.

In order to achieve the abovementioned objective, the present invention further provides a high-magnesium concentrated liquid, which comprises magnesium ranged from 80000-100000 ppm, sodium ranged from 3200-12000 ppm, potassium ranged from 3000-20000 ppm, calcium ranged from 100-200 ppm, and the balance of water.

The present invention has an advantage over the conventional technologies: the high-magnesium concentrated liquid is experimentally proved to be useful in improving osteoporosis and relieve fatigue.

BRIEF DESCRIPTION OF THE DRAWINGS

FIGS. 5A-5H are diagrams showing the variation of the number of RBCs and the value of tHB, which are measured before exercise, after exercise and two hours later after exercise, of the experiment group and the control group taking PLA and a high-magnesium concentrated liquid according to the second embodiment of the present invention.

DETAILED DESCRIPTION OF THE PREFERRED EMBODIMENTS

The technical contents of the present invention will be described in detail in cooperation with drawings below.

The present invention proposes a high-magnesium concentrated liquid. In a first embodiment, the high-magnesium concentrated liquid comprises magnesium ranged from 60000-70000 ppm, sodium ranged from 1000-3200 ppm, potassium ranged from 300-3000 ppm, calcium ranged from 100-300 ppm, and the balance of water.

In a second embodiment, the high-magnesium concentrated liquid comprises magnesium ranged from 40000-50000 ppm, sodium ranged from 8000-28000 ppm, potassium ranged from 3000-20000 ppm, calcium ranged from 15-500 ppm, and the balance of water.

In a third embodiment, the high-magnesium concentrated liquid comprises magnesium ranged from 80000-100000 ppm, sodium ranged from 3200-12000 ppm, potassium ranged from 3000-20000 ppm, calcium ranged from 100-200 ppm, and the balance of water.

Figure 1:
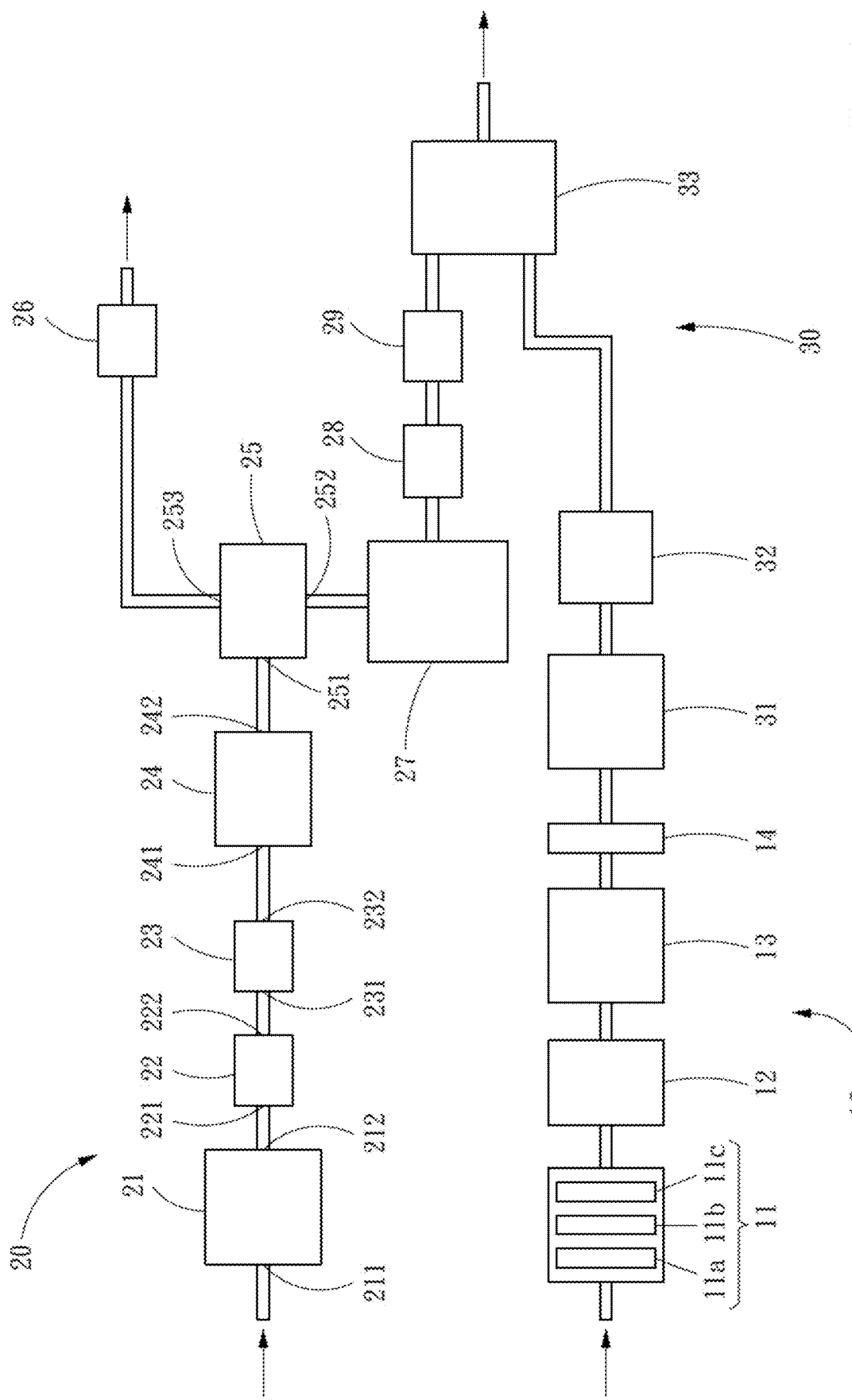
FIG. 1 is a diagram schematically showing a high-magnesium potable-water mixing system according to one embodiment of the present invention.
Figure 2A:
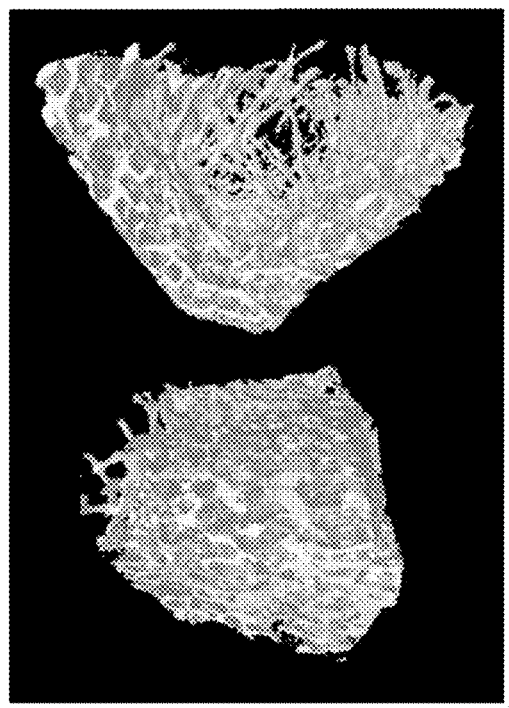
FIGS. 2A-2F are the Micro-CT-based bone density images of the rats of the experiment groups, control groups and comparison groups using a high-magnesium concentrated liquid according to a first embodiment of the present invention.
Figure 2B:
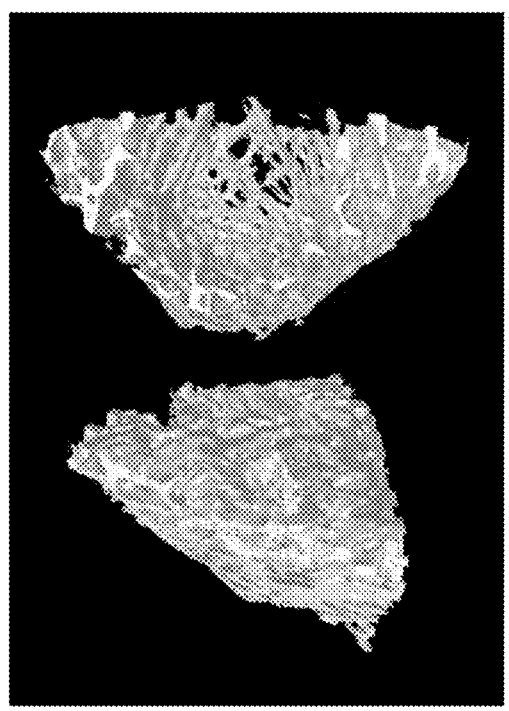
Figure 2D:
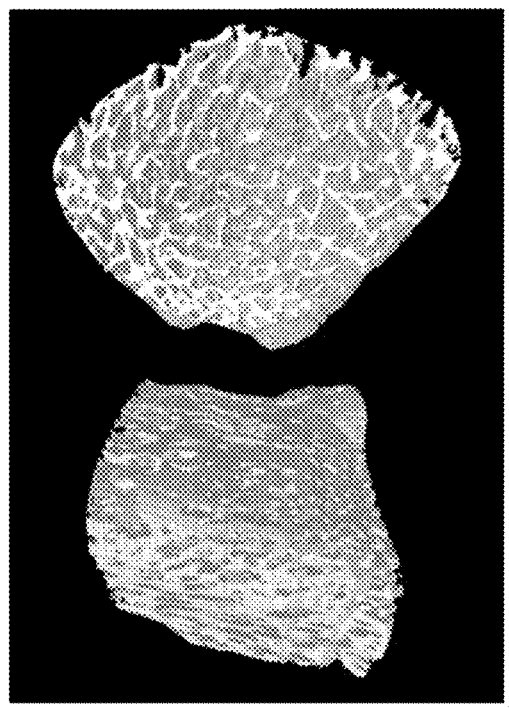
Figure 2C:
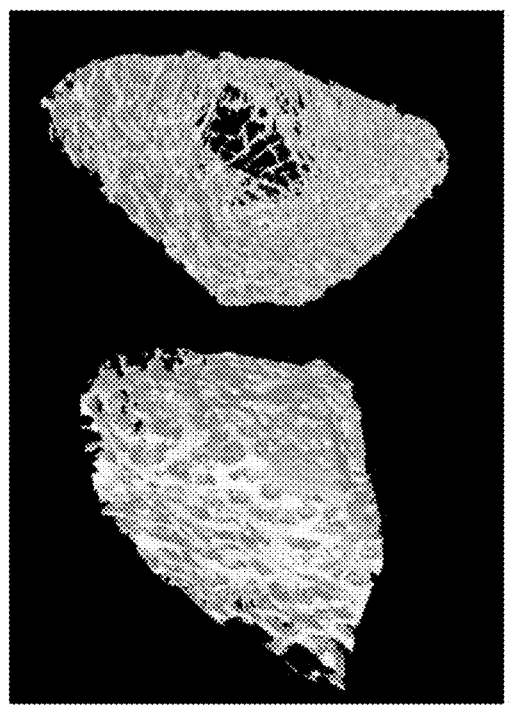
Figure 2F:
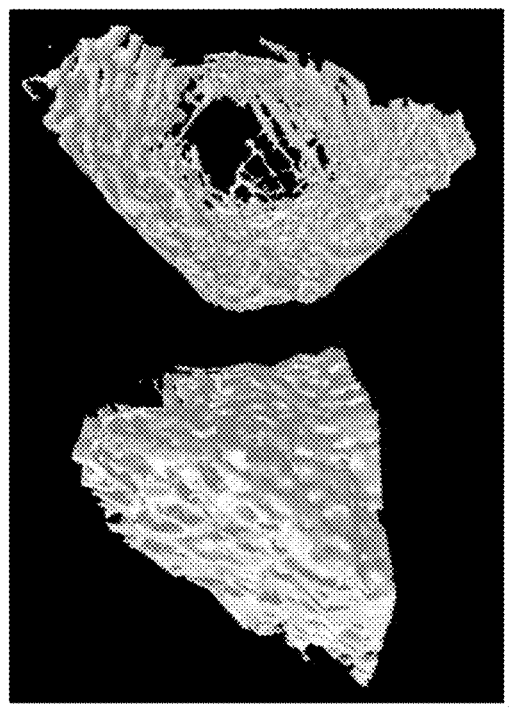
Figure 2E:
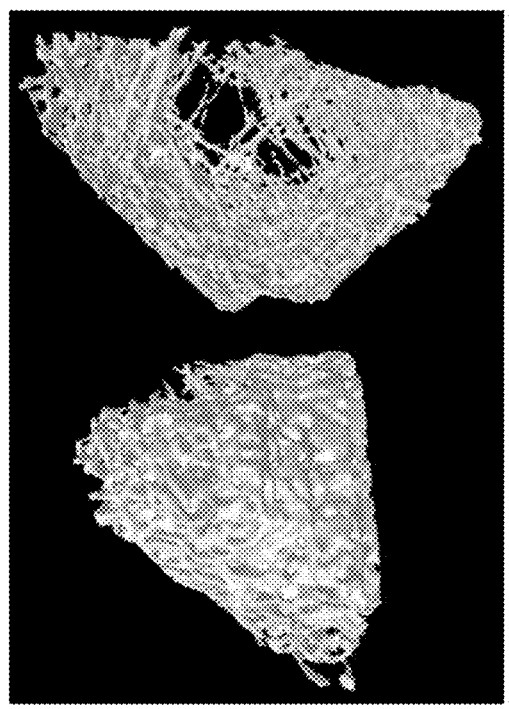
Figure 3A:
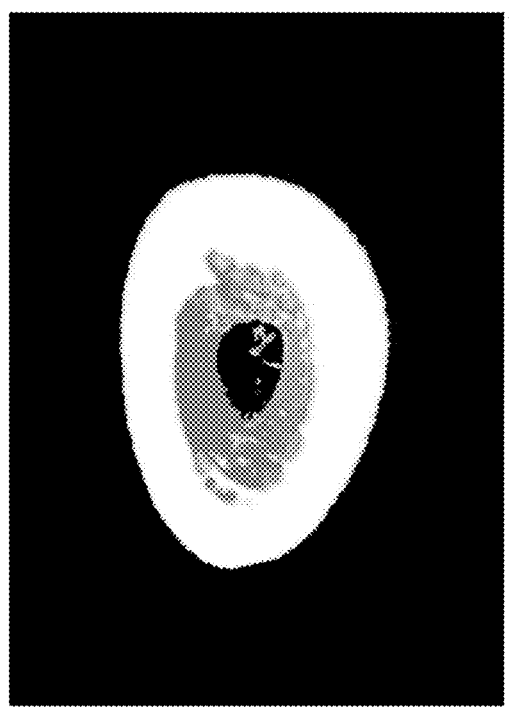
FIGS. 3A-3F are the Micro-CT-based trabecula images of the rats of the experiment groups, control groups and comparison groups using a high-magnesium concentrated liquid according to the first embodiment of the present invention.
Figure 3B:
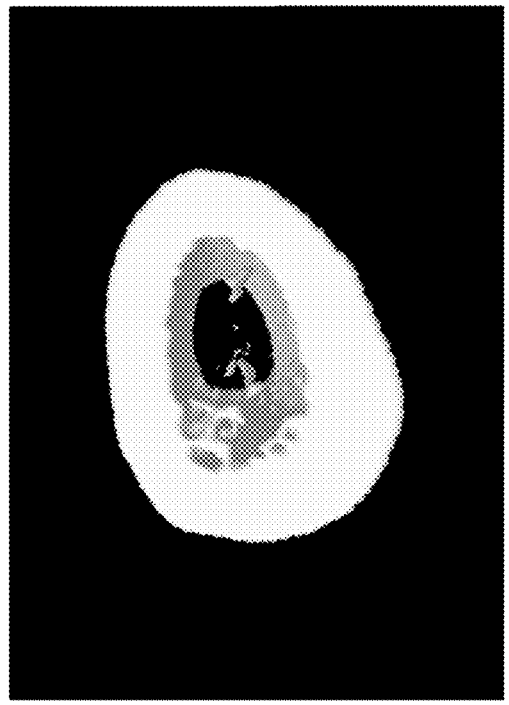
Figure 3D:
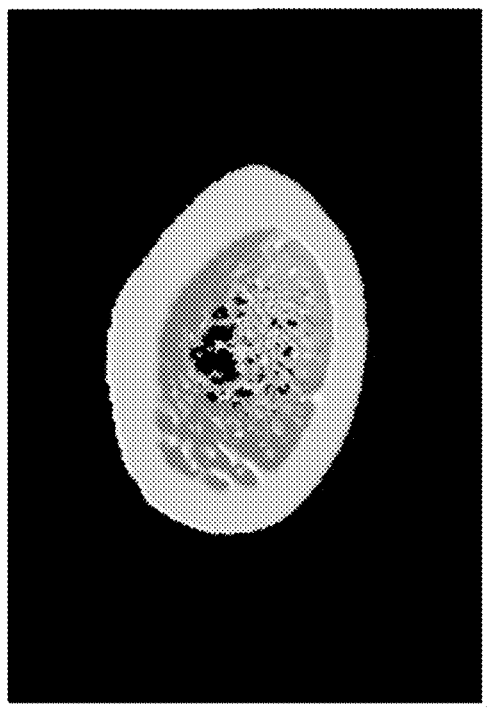
Figure 3C:
Figure 3F:
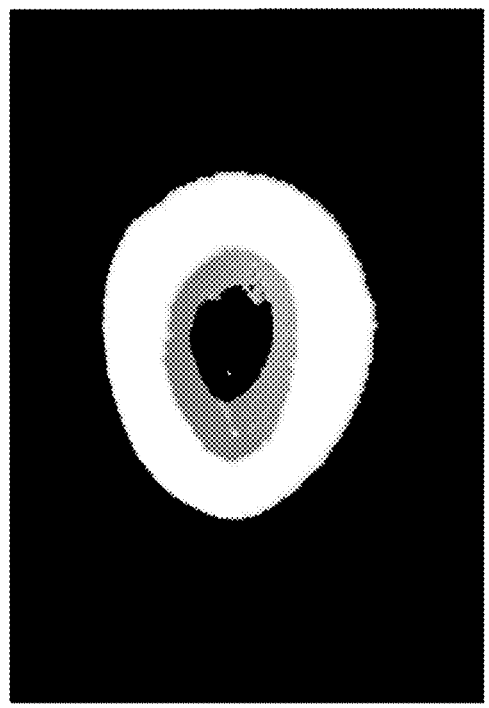
Figure 3E:
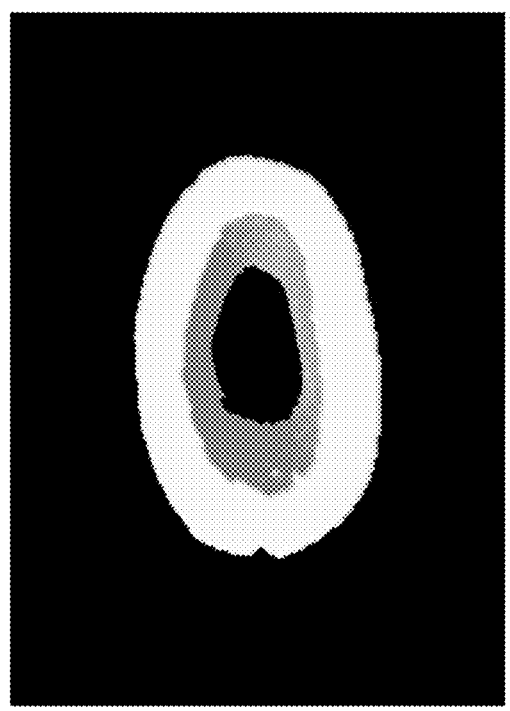
Figure 4:
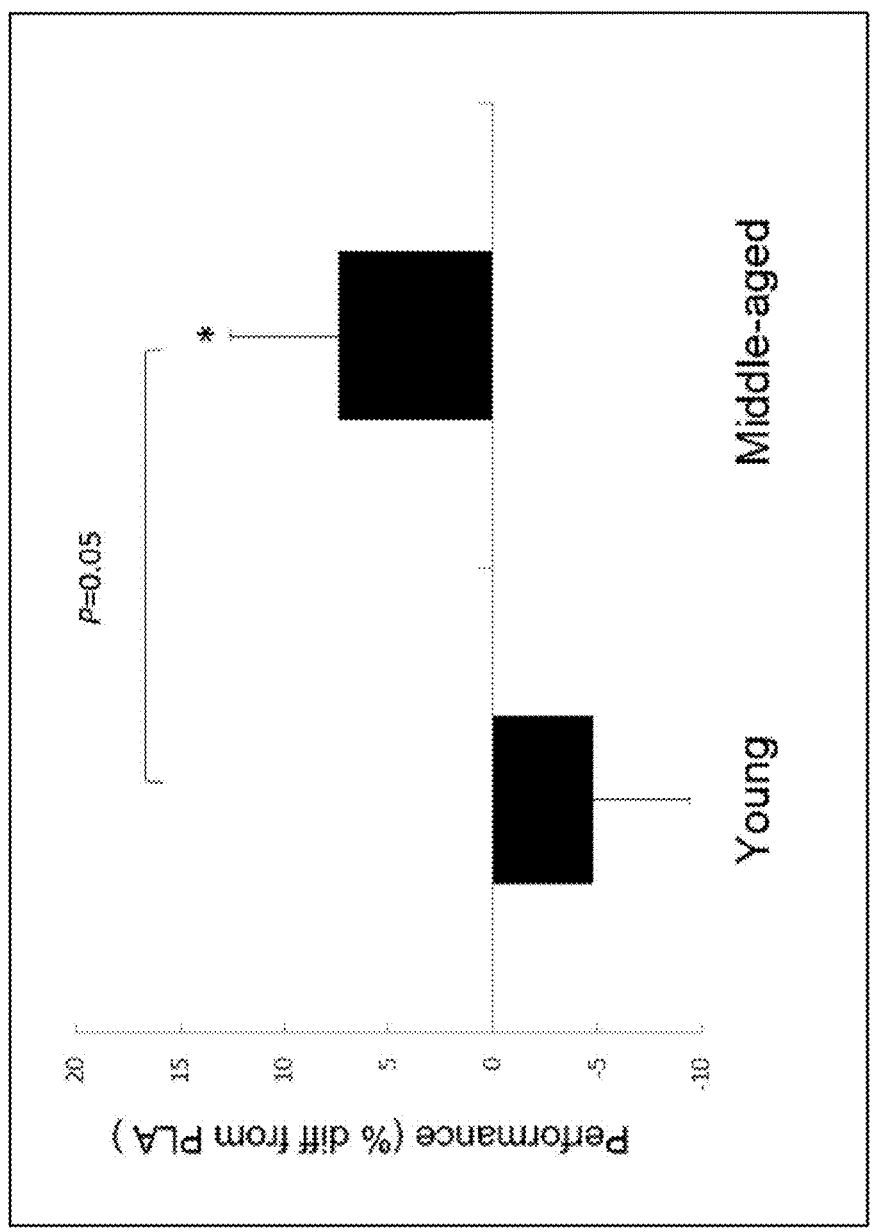
FIG. 4 is a diagram showing the exercise performance of the experiment group and the control group taking PLA and a high-magnesium concentrated liquid according to a second embodiment of the present invention.

The present invention further proposes a high-magnesium potable-water mixing system. Refer to FIG. 1 a diagram schematically showing a high-magnesium potable-water mixing system according to one embodiment of the present invention. In this embodiment, the high-magnesium potable-water mixing system comprises a high-magnesium concentrated liquid output device 10, a purified water output device 20, and a liquid mixing device 30. The high-magnesium concentrated liquid output device 10 provides the above-mentioned high-magnesium concentrated liquid. The purified water output device 20 provides purified water. The liquid mixing device 30 interconnects with the high-magnesium concentrated liquid output device 10 and the purified water output device 20 and mixes the high-magnesium concentrated liquid and the purified water to generate a high-magnesium potable water.

In one embodiment, the high-magnesium concentrated liquid output device 10 is a device generating the high-magnesium concentrated liquid or a container storing the high-magnesium concentrated liquid. Refer to FIG. 1 for the high-magnesium concentrated liquid generation device. In the embodiment shown in FIG. 1, the high-magnesium concentrated liquid generation device comprises a filter 11, a vacuum low-temperature concentration unit 12, and an atmospheric evaporation unit 13. Based on the high-magnesium concentrated liquid generation device, the process for generating the high-magnesium concentrated liquid comprises Steps S1-S4.

In Step S1, providing deep ocean water and using the filter 11 to filter the deep ocean water to obtain a first concentrated liquid, which comprises magnesium ranged from 1900-3000 ppm, sodium ranged from 13000-21000 ppm, potassium ranged from 550-1000 ppm, calcium ranged from 600-1000 ppm, and the balance of water. In one embodiment, the deep ocean water comes from an ocean layer 200-1500 m deep, preferably 300-700 m deep. In the embodiment shown in FIG. 1, the filter 11 includes a microfiltration membrane 11a, an ultrafiltration membrane 11b, and a reverse osmosis membrane 11c. In one embodiment, the microfiltration membrane 11a has a first pore diameter of 0.025-10 μm, filtering out the suspended matters in the deep ocean water, such as soil, water bloom, microorganism, etc.; the ultrafiltration membrane 11b has a pore diameter of 5-10 nm, filtering out microparticles or bacteria in the deep ocean water; the reverse osmosis membrane 11c has a third pore diameter of 0.2-1.0 nm, filtering out salts in the deep ocean water.

In Step S2, using the vacuum low-temperature concentration unit 12 to concentrate the first concentrated liquid to obtain a second concentrated liquid, which comprises magnesium ranged from 10000-160000 ppm, sodium ranged from 60000-100000 ppm, potassium ranged from 3000-6000 ppm, calcium ranged from 300-500 ppm, and the balance of water. The vacuum low-temperature concentration unit 12 has a temperature of 50-70° C. and a pressure of 10-20 KPa.

In Step S3, using the atmospheric evaporation unit 13 to heat the second concentrated liquid to precipitate a crystalline salt, setting the second concentrated liquid still to let the crystalline salt settle down on the bottom, and then sucking the liquid on the top to acquire a third concentrated liquid. In one embodiment, the atmospheric evaporation unit 13 heats the second concentrated liquid at a temperature of 90-120° C.

In Step S4, cooling down the third concentrated liquid, and using a filter membrane 14 having a specified pore diameter to filter the third concentrated liquid and screen out impurities to acquire a high-magnesium concentrated liquid, wherein the filter membrane 14 has a pore diameter of 0.2-2.0 μm. After being filtered, the concentrations of the third concentrated liquid are unchanged. In other words, the concentrations of the third concentrated liquid are the same as the concentrations of the high-magnesium concentrated liquid. By adjusting the parameters of the process and selection of the deep ocean water, the desired composition of high-magnesium concentrated liquid can be produced. According to the present invention, the high-magnesium concentrated liquid includes at least following three recipes.

In a first embodiment, the high-magnesium concentrated liquid comprises magnesium ranged from 60000-70000 ppm, sodium ranged from 1000-3200 ppm, potassium ranged from 300-3000 ppm, calcium ranged from 100-300 ppm, and the balance of water.

In a second embodiment, the high-magnesium concentrated liquid comprises magnesium ranged from 40000-50000 ppm, sodium ranged from 8000-28000 ppm, potassium ranged from 3000-20000 ppm, calcium ranged from 15-500 ppm, and the balance of water. Furthermore, in one preferred example of the second embodiment, the high-magnesium concentrated liquid comprises magnesium ranged from 40000-50000 ppm, sodium ranged from 8000-18000 ppm, potassium ranged from 8000-17000 ppm, calcium ranged from 15-25 ppm, and the balance of water. In another preferred example of the second embodiment, the high-magnesium concentrated liquid comprises magnesium ranged from 40000-50000 ppm, sodium ranged from 18000-28000 ppm, potassium ranged from 3000-20000 ppm, calcium ranged from 100-500 ppm, and the balance of water.

In a third embodiment, the high-magnesium concentrated liquid comprises magnesium ranged from 80000-100000 ppm, sodium ranged from 3200-12000 ppm, potassium ranged from 3000-20000 ppm, calcium ranged from 100-200 ppm, and the balance of water.

Referring again to FIG. 1, the purified water output device 20 is a purification device filtering unpurified water to obtain purified water or a container storing purified water. In the embodiment shown in FIG. 1, the purified water output device 20 is a purification device and includes a first filter core 21, a low-pressure switch 22, a water intake electromagnetic valve 23, a booster pump 24, and a reverse osmosis core 25. The first filter core 21 includes a first inlet 211 and a first outlet 212. The low-pressure switch 22 includes a second inlet 221 connected with the first outlet 212 and a second outlet 222, detecting whether the unpurified water is persistently supplied to the first filter core 21. The water intake electromagnetic valve 23 includes a third inlet 231 connected with the second outlet 222 and a third outlet 232, controlling the flow rate of the unpurified water. The booster pump 24 includes a fourth inlet 241 connected with the third outlet 232 and a fourth outlet 242, pressurizing the unpurified water to increase the flow rate of the unpurified water. The reverse osmosis core 25 includes a fifth inlet 251 connected with the fourth outlet 242 and a fifth outlet 252.

The purified water output device 20 may further include a flush electromagnetic valve 26, a purified water storage tank 27, a heating element 28, and a sterilization element 29. The flush electromagnetic valve 26 is connected with a sixth outlet 253 of the reverse osmosis core 25, controlling the flow rate of the water flushing the reverse osmosis core 25. The purified water storage tank 27 is disposed between the reverse osmosis core 25 and the liquid mixing device 30, storing the purified water output by the fifth outlet 252. The heating element 28 is disposed between the reverse osmosis core 25 and the liquid mixing device 30, heating the purified water to generate hot water and supplying the hot water to the liquid mixing device 30. The sterilization element 29 is disposed between the reverse osmosis core 25 and the liquid mixing device 30, sterilizing the purified water to generate sterile water and supplying the sterile water to the liquid mixing device 30.

The liquid mixing device 30 includes a liquid storage tank 31, a suction pump 32, and a liquid mixing unit 33. The liquid storage tank 31 stores the high-magnesium concentrated liquid. The suction pump 32 sucks the high-magnesium concentrated liquid from the liquid storage tank 31. The liquid mixing unit 33 mixes the purified water output by the fifth outlet 252 and the high-magnesium concentrated water sucked from the liquid storage tank 31 to generate the high-magnesium potable water. The liquid mixing device 30 formulates the high-magnesium concentrated liquids into potable water having appropriate hardnesses for different applications.

The above-mentioned high-magnesium concentrated liquids of the present invention with specific ranges of mineral elements are tailored to improve osteoporosis and bone health of users and also relieve fatigue. The experiment groups and comparison groups described thereinafter will be used to demonstrate the efficacies of the embodiments of the present invention.

With respect to the high-magnesium concentrated liquid of the first embodiment, the ovariectomized rats are used to simulate menopausal females. Owing to hormone variation, menopausal females lose their bones fast and suffer from osteoporosis easily. The rats used in the experiment groups, control group, and comparison groups are female Sprague-Dawley rats. The rats are fed with different proportions of the high-magnesium potable water beforehand. Then, the serum and tissue slices of the rats are analyzed.

The dosages of the high-magnesium concentrated liquid fed to the rats in experiment groups, control group and comparison groups are shown in Table.1. The unit of the dosage is milliliter or gram per kilogram of body weight. The control group is the group of unovariectomized rats. The supply of calcium citrate is to learn the influence of calcium on osteoporosis.

TABLE. 1 the feeding conditions for experiment groups, control groups and comparison groups

| | High-Magnesium Concentrated Liquid (ml/kg) | Calcium Citrate (g/kg) |
|---|---|---|
| Experiment 1 (L) | 0.35 | 0 |
| Experiment 2 (H) | 1.4 | 0 |
| Experiment 3 (HC) | 1.4 | 0.5 |
| Control (N) | 0 | 0 |
| Comparison 1 (OVX) | 0 | 0 |
| Comparison 2 (OVXC) | 0 | 0.5 |

Table.2 shows the concentrations of alkaline phosphatase (ALP), glutamate oxaloacetate transaminase (GOT), blood urea nitrogen (BUN), creatinine (CRE), glutamic-pyruvic transaminase (GPT) in the serum of the rats fed with the test agents in the experiment groups, control group and comparison groups.

TABLE. 2 the serum test results of the experiment groups, control group and comparison groups

| | ALP (U/L) | BUN (mg/dL) | CRE (mg/dL) | GOT (U/L) | GPT (U/L) |
|---|---|---|---|---|---|
| Experiment 1 (L) | 100 | 25 | 0.88 | 90 | 60 |
| Experiment 2 (H) | 125 | 19 | 0.81 | 140 | 95 |
| Experiment 3 (HC) | 100 | 18 | 0.83 | 91 | 57 |
| Control (N) | 115 | 24.5 | 0.77 | 113 | 61 |
| Comparison 1 (OVX) | 202 | 21.5 | 0.83 | 101 | 60 |
| Comparison 2 (OVXC) | 130 | 17 | 0.85 | 75 | 75 |

Table.3 shows the concentrations of calcium, magnesium, potassium, sodium and phosphor in the serum of the rats fed with the test agents in the experiment groups, control group and comparison groups.

TABLE. 3 the serum test results of the experiment groups, control group and comparison groups

| | Calcium (mg/dL) | Magnesium (mmol/L) | Potassium (mmol/L) | Sodium (mmol/L) | Phosphor (mg/dL) |
|---|---|---|---|---|---|
| Experiment 1 (L) | 12.1 | 2.75 | 6.4 | 144 | 5.6 |
| Experiment 2 (H) | 12 | 3 | 6.25 | 144 | 7.9 |
| Experiment 3 (HC) | 12 | 2.8 | 6.5 | 144 | 6.8 |
| Control (N) | 12.7 | 3.35 | 6.9 | 140 | 9.7 |
| Comparison 1 (OVX) | 12.05 | 3.01 | 6.3 | 143 | 6.4 |
| Comparison 2 (OVXC) | 12.4 | 2.9 | 5.8 | 143 | 8 |

It is learned from Table.2: ALP of the ovariectomized rats rises from 115 (U/L) to 202 (U/L), which reflects osteoporosis. After the rats are fed with the high-magnesium concentrated liquid of the first embodiment, ALP is significantly lowered to 125 (U/L), which indicates that the high-magnesium concentrated liquid of the first embodiment can effectively improve osteoporosis. From the test results of BUN, CRE, GOT and GPT, it is learned: feeding the high-magnesium concentrated liquid does not affect the functions of livers and kidneys of the rats of the experiment groups. From Table.3, it is learned: feeding the high-magnesium concentrated liquid does not generate negative effects on the serum.

In addition to the serum examinations, the bone densities and the trabecula images of the rats of the experiment groups, control group and comparison groups are observed with a micro computed tomography (Micro-CT) technology, as shown in FIGS. 2A-2F and FIGS. 3A-3F. FIGS. 2A-2F are respectively the images of the bone densities of the rats of Experiment Group I, Experiment Group II, Experiment Group III, Control Group, Comparison Group I, and Comparison Group II. FIGS. 3A-3F are respectively the trabecula images of the rats of Experiment Group I, Experiment Group II, Experiment Group III, Control Group, Comparison Group I, and Comparison Group II. It can be observed in FIGS. 2A-2C: the rats of the experiment groups and the control group have higher bone density. It can be observed in FIG. 2E and FIG. 2F: the rats of the comparison groups have lower bone density. It can be observed in FIGS. 3A-3C: the rats of the experiment groups and the control group have more compact trabecula distribution. It can be observed in FIG. 3E and FIG. 3F: the rats of the comparison groups have less compact trabecula distribution.

With respect to the high-magnesium concentrated liquid of the second embodiment, middle-aged males are used in the experiment groups, and the young males are used in the control group. The exercise performance and numbers of red blood cells (RBCs) before, during and after exercise are measured, as shown in FIG. 4 and FIGS. 5A-5G FIG. 4 shows the exercise performances of the experiment group and the control group, which take the high-magnesium concentrated liquid of the second embodiment and the placebo (PLA). The high-magnesium potable water taken by the experiment group is formulated to be potable water having a hardness of 600. It can be observed in FIG. 4: the exercise endurance performance of the control group taking the high-magnesium concentrated liquid does not improve but lowers by about 4.77%; the exercise endurance performance of the experiment group taking the high-magnesium concentrated liquid improves significantly and increases by about 7.36%.

Figure 5D:
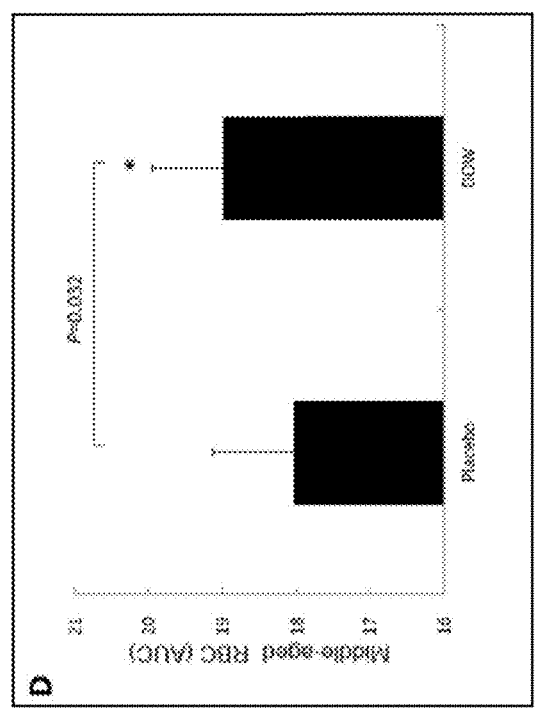
Figure 5C:
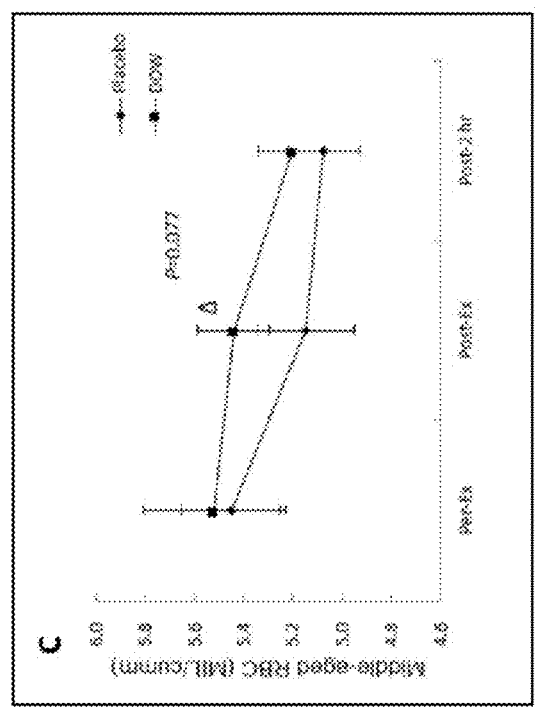
Figure 5H:
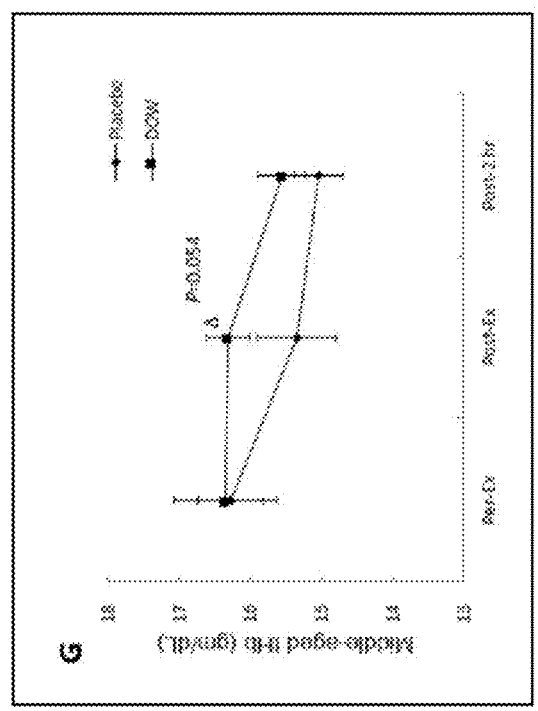
Figure 5G:
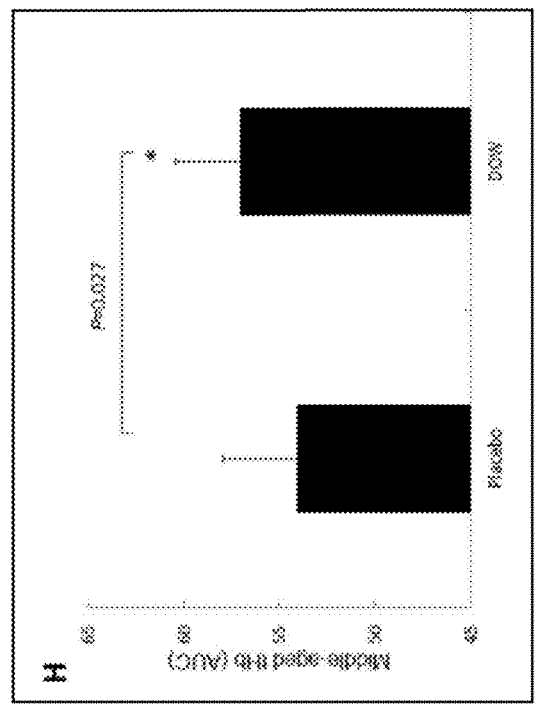

FIG. 5A and FIG. 5C shows the numbers of RBCs measured before exercise, after exercise, and two hours later after exercise for the experiment group and the control group, which take the high-magnesium concentrated liquid and PLA. FIG. 5B and FIG. 5D respectively show the areas under the curves of FIG. 5A and FIG. 5C. FIG. 5E and FIG. 5G shows the total hemoglobin (tHB) measured before exercise, after exercise, and two hours later after exercise for the experiment group and the control group, which take the high-magnesium concentrated liquid taking and PLA. FIG. 5F and FIG. 5H respectively show the areas under the curves of FIG. 5E and FIG. 5G. From the drawings, it can be observed: for the control group, taking the high-magnesium concentrated liquid and PLA does not influence RBCs and tHB; for the experiment group, taking the high-magnesium concentrated liquid significantly increases the number of RBCs and the value of tHB, however. The decrease of RBCs of the experiment group taking PLA may be attributed to hemolysis induced by exercise. Hemolysis impairs oxygen transportation, inhibits RBC-mediated vasorelaxation, and thus adversely affects the performance of exercise. The trend of tHB is similar to RBCs. Therefore, it is inferred: the high-magnesium concentrated liquid of the second embodiment can relieve the exercise-induced hemolysis and thus can enhance the exercise endurance of middle-aged males.

In conclusion, the compositions of the high-magnesium concentrated liquids of the present invention are experimentally proved to have the function of improve osteoporosis or relieve fatigue.

The present invention has been demonstrated in detail with the above embodiments. However, these embodiments are only to exemplify the present invention but not to limit the scope of the present invention. Any equivalent modification or variation according to the specification or claim of the present invention is to be also included within the scope of the present invention.

What is claimed is:

1. A high-magnesium concentrated liquid comprising magnesium ranged from 60000-70000 ppm, sodium ranged from 1000-3200 ppm, potassium ranged from 300-3000 ppm, calcium ranged from 100-300 ppm, and water.

2. The high-magnesium concentrated liquid according to claim 1, wherein the high-magnesium concentrated liquid is obtained via concentrating deep ocean water coming from an ocean layer 200-1500 m deep.

3. The high-magnesium concentrated liquid according to claim 2, wherein the ocean layer is 300-700 m deep.

4. A high-magnesium concentrated liquid comprising magnesium ranged from 40000-50000 ppm, sodium ranged from 8000-28000 ppm, potassium ranged from 3000-20000 ppm, calcium ranged from 15-500 ppm, and water.

5. The high-magnesium concentrated liquid according to claim 4, wherein the high-magnesium concentrated liquid is obtained via concentrating deep ocean water coming from an ocean layer 200-1500 m deep.

6. The high-magnesium concentrated liquid according to claim 5, wherein the ocean layer is 300-700 m deep.

7. The high-magnesium concentrated liquid according to claim 4, wherein the high-magnesium concentrated liquid is obtained via concentrating deep ocean water coming from an ocean layer 200-1500 m deep.

8. The high-magnesium concentrated liquid according to claim 5, wherein the ocean layer is 300-700 m deep.

9. A high-magnesium concentrated liquid comprising magnesium ranged from 80000-100000 ppm, sodium ranged from 3200-12000 ppm, potassium ranged from 3000-20000 ppm, calcium ranged from 100-200 ppm, and water.

* * * * *